(12) United States Patent
Lee et al.

(10) Patent No.: US 11,742,952 B2
(45) Date of Patent: Aug. 29, 2023

(54) BURSTMODE OPTICAL TRANSMITTER

(71) Applicant: ELECTRONICS AND TELECOMMUNICATIONS RESEARCH INSTITUTE, Daejeon (KR)

(72) Inventors: Han Hyub Lee, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/871,176

(22) Filed: Jul. 22, 2022

(65) Prior Publication Data

US 2023/0144071 A1 May 11, 2023

(30) Foreign Application Priority Data

Nov. 9, 2021 (KR) .................. 10-2021-0153101

(51) Int. Cl.
| H04J 14/00 | (2006.01) |
| H04B 10/508 | (2013.01) |
| H04B 10/69 | (2013.01) |
| H04B 10/50 | (2013.01) |
| H04B 10/40 | (2013.01) |

(52) U.S. Cl.
CPC ........... *H04B 10/508* (2013.01); *H04B 10/40* (2013.01); *H04B 10/504* (2013.01); *H04B 10/697* (2013.01)

(58) Field of Classification Search
CPC .... H04B 10/508; H04B 10/40; H04B 10/504; H04B 10/27; H04B 10/564; H04B 10/503; H04B 10/697; H04B 10/505; H04J 14/0278; H04J 14/0227; H04J 14/0216; H04J 14/0249
USPC ...... 398/66, 67, 68, 69, 70, 71, 72, 99, 100, 398/182, 183, 189, 193, 194, 195, 135, 398/137, 138, 139, 158, 159, 33, 38, 154, 398/155, 75, 197, 198, 199, 196
See application file for complete search history.

(56) References Cited

U.S. PATENT DOCUMENTS

| 7,245,413 B2 | 7/2007 | Miura et al. |
| 8,712,243 B2 * | 4/2014 | Chow .................. H04J 3/1694 398/67 |
| 9,686,036 B2 | 6/2017 | Li et al. |
| 9,843,158 B2 | 12/2017 | Wang et al. |

(Continued)

FOREIGN PATENT DOCUMENTS

| KR | 10-1304424 B1 | 9/2013 |
| KR | 10-2019-0122553 A | 10/2019 |

OTHER PUBLICATIONS

Hiroshi Koizumi et al., "A Burst-Mode Laser Diode Driver with Burst-by-Burst Power Saving for 10G-EPON Systems", ECOC Technical Digest 2012.

*Primary Examiner* — Hanh Phan
(74) *Attorney, Agent, or Firm* — LRK PATENT LAW FIRM (57) ABSTRACT

Provided is a burst mode optical transmitter capable of preventing an optical signal from being output from a light source during burst mode disable time through an arithmetic circuit configured to remove an idle signal included in a MAC electrical signal by using a MAC electrical signal and a burst mode control signal.

13 Claims, 5 Drawing Sheets

(56) References Cited

U.S. PATENT DOCUMENTS

| | | |
|---|---|---|
| 9,923,637 B2 | 3/2018 | Asaka et al. |
| 2004/0073699 A1 | 4/2004 | Hong et al. |
| 2017/0237232 A1* | 8/2017 | Asaka .................. H04B 10/503 |
| | | 372/38.02 |
| 2019/0305871 A1* | 10/2019 | Lee ....................... H04J 3/1694 |

* cited by examiner

BURSTMODE OPTICAL TRANSMITTER

CROSS-REFERENCE TO RELATED APPLICATION

This application claims the benefit of Korean Patent Application No. 10-2021-0153101 filed on Nov. 9, 2021, in the Korean Intellectual Property Office, the entire disclosure of which is incorporated herein by reference for all purposes.

BACKGROUND

1. Field of the Invention

One or more example embodiments are relate to a burst mode optical transmitter, and more particularly, to a device and method for preventing light from being output from a light source during burst mode disable time.

2. Description of Related Art

Burst mode optical transmission is a method in which an optical transmitter does not continuously output an optical signal but outputs a cluster optical signal only during permitted time. Therefore, in the burst mode optical transmission, it is very important to control the optical transmitter so that the optical signal is output only during the permitted time and no optical signal is output during non-permitted time. Such a burst mode optical transmission technology is used as an upstream optical signal transmission technology in a passive optical network (PON) using a time domain multiplexing (TDM) scheme (TDM-PON).

The TDM-PON is capable of using an optical splitter in the middle of an optical path to deliver data signals to a plurality of subscribers so that a plurality of subscriber devices may be accommodated in the single optical path, and does not need to install a system using power for optical infrastructure between a central office of telecom operator and subscribers.

Using the physical optical fiber characteristic, the TDM-PON may use a broadcasting scheme in the case of a downstream optical signal transmitted from the central office to the subscribers, and use a TDM scheme in the case of an upstream optical signal transmitted from the subscribers to the central office, thereby transmitting signals.

In order to transmit the upstream optical signal in the TDM scheme, optical network units (hereinafter referred to as ONUs) used on the subscriber side must transmit the upstream optical signal only from one ONU at the same time. For this, each ONU transmits the upstream optical signal only after being allocated an allowable time for transmitting the upstream optical signal from an optical line terminal (OLT) used in the central office.

At this time, since each ONU transmits the optical signal only during the allocated time (permitted time), the OLT receives the upstream optical signal sequentially according to time. However, if the ONU transmits the upstream optical signal at time that is not allocated, the upstream optical signal may be overlapped with an upstream optical signal transmitted from another ONU to act as an optical noise, thereby increasing a possibility of an upstream transmission error.

SUMMARY

Example embodiments provide a device and method for preventing an optical signal from being output from a light source during burst mode disable time through an arithmetic circuit configured to remove an idle signal included in a data signal by using a burst mode control signal and the data signal output from an ONU.

Example embodiments provide a device and method for preventing an optical signal from being output from a light source during the burst mode disable time by determining whether to operate a modulation voltage output circuit by applying the burst mode control signal to the modulation voltage output circuit configured to output an electrical signal required for modulation of the light source.

According to an aspect, there is provided a burst mode optical transmitter including a clock and data recovery circuit configured to receive a media access control (MAC) electrical signal including a valid data signal and an idle signal from MAC of an ONU according to a burst mode control signal, an arithmetic circuit configured to remove the idle signal included in the MAC electrical signal by using the burst mode control signal and the MAC electrical signal in which clock and data are recovered through the clock and data recovery circuit, a modulation voltage output circuit configured to output an electrical signal including a modulation voltage and a bias voltage required for modulation of a light source including a laser diode by using the MAC electrical signal from which the idle signal is removed, and a bias voltage supply circuit configured to provide operating power for the light source to output an optical signal based on the electrical signal output through the modulation voltage output circuit.

The arithmetic circuit may include a logic gate configured to provide high output only when levels of the MAC electrical signal and the burst mode control signal are both high.

The logic gate may be an AND gate.

The burst mode optical transmitter may further include a burst mode current control circuit configured to control output of the light source by adjusting a voltage across both ends of the light source including the laser diode based on the burst mode control signal.

The burst mode current control circuit may include an electric switch configured to be connected to ground when the burst mode control signal is enabled and be connected to a collector voltage (Vcc) when the burst mode control signal is disabled.

According to another aspect, there is provided a burst mode optical transmitter including a clock and data recovery circuit configured to receive a MAC electrical signal including a valid data signal and an idle signal from MAC of an ONU according to a burst model control signal, an arithmetic circuit configured to remove the idle signal included in the MAC electrical signal by using the burst mode control signal and the MAC electrical signal in which the clock and data are recovered through the clock and data recovery circuit, a modulation voltage output circuit configured to output an electrical signal required for modulation of a light source by using the MAC electrical signal from which the idle signal is removed, and a burst mode current control circuit configured to control output of the light source by adjusting a voltage across both ends of the light source based on the burst mode control signal, wherein it is determined whether or not the modulation voltage output circuit operates according to the burst mode control signal.

The modulation voltage output circuit may be configured to operate normally when the burst mode control signal is enabled, and be powered off when the burst mode control signal is disabled.

The arithmetic circuit may include a logic gate configured to provide high output only when levels of the MAC electrical signal and the burst mode control signal are both high.

The logic gate may be an AND gate.

The burst mode current control circuit may include an electric switch configured to be connected to ground when the burst mode control signal is enabled and be connected to a collector voltage (Vcc) when the burst mode control signal is disabled.

According to another aspect, there is provided a burst mode optical transmitter including a clock and data recovery circuit configured to receive a MAC electrical signal including a valid data signal and an idle signal from MAC of an ONU according to a burst mode control signal, an arithmetic circuit configured to remove the idle signal to included in the MAC electrical signal by using the burst mode control signal and the MAC electrical signal in which clock and data are recovered through the clock and data recovery circuit, a modulation voltage output circuit configured to output an electrical signal required for modulation of a light source by using the MAC electrical signal from which the idle signal is removed, a bias voltage supply circuit configured to provide operating power for the light source to output an optical signal based on the electrical signal output through the modulation voltage output circuit, and a burst mode current control circuit configured to control output of the light source by adjusting a voltage across both ends of the light source based on the burst mode control signal, wherein the arithmetic circuit includes an AND gate configured to provide high output only when the input of the MAC electrical signal and the burst mode control signal are both high, and it is determined whether or not the modulation voltage output circuit operates according to the burst mode control signal.

The modulation voltage output circuit may be configured to operate normally when the burst mode control signal is enabled, and be powered off when the burst mode control signal is disabled.

The burst mode current control circuit may include an electric switch configured to be connected to ground when the burst mode control signal is enabled and be connected to a collector voltage (Vcc) when the burst mode control signal is disabled.

Additional aspects of example embodiments will be set forth in part in the description which follows and, in part, will be apparent from the description, or may be learned by practice of the disclosure.

According to example embodiments, it is possible to prevent an optical signal from being output from a light source during burst mode disable time through an arithmetic circuit configured to remove an idle signal included in a MAC electrical signal by using a MAC electrical signal and a burst mode control signal.

According to example embodiments, it is possible to prevent an optical signal from being output from a light source during the burst mode disable time by determining whether to operate a modulation voltage output circuit by applying a burst mode control signal to the modulation voltage output circuit configured to outputting an electrical signal required for modulation of the light source.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
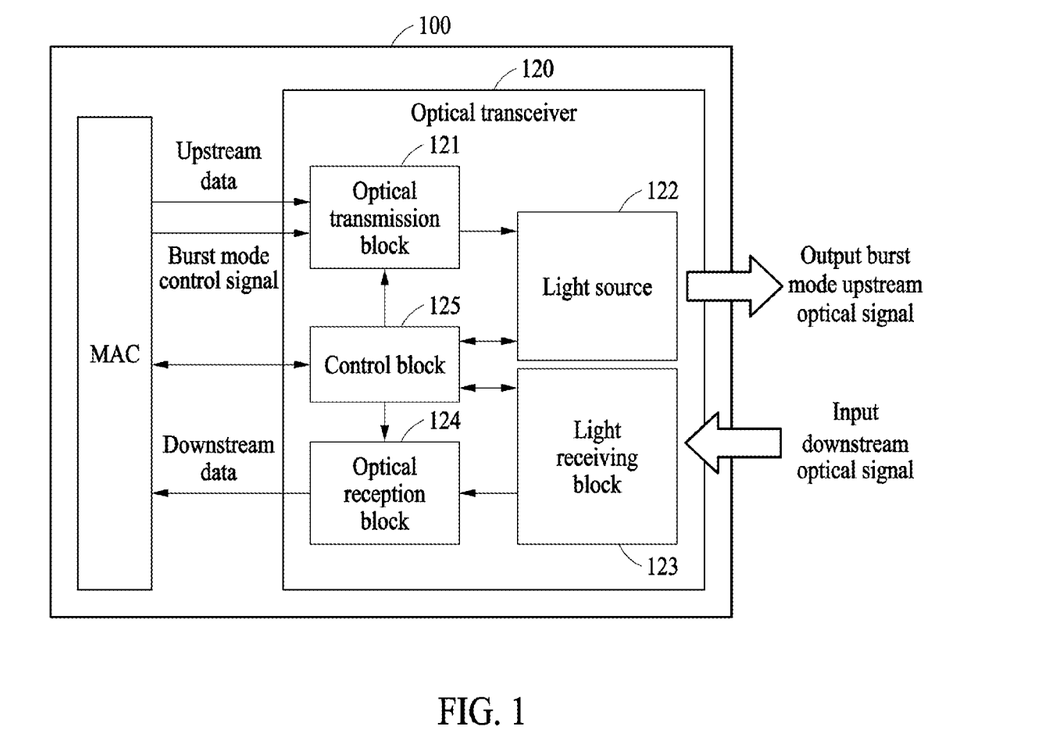
FIG. 1 is a block diagram illustrating an ONU structure including a burst mode optical transmitter of a TDM-PON according to an example embodiment.

FIG. 1 is a block diagram illustrating an ONU structure including a burst mode optical transmitter of a TDM-PON according to an example embodiment.

An upstream burst mode optical transmission function in an ONU 100 of the TDM-PON may be implemented using MAC 110 and an optical transceiver 120 of the ONU 100. Here, the optical transceiver 120 has a downstream continuous mode optical reception function and an upstream burst mode optical transmission function, and may include an optical transmission block 121, a light source block 122, a light receiving block 123, a optical reception block 124, and a control block 125.

First, the MAC 110 of the ONU 100 may transmit a burst mode control signal and a MAC electrical signal including a valid data signal and an idle signal according to the burst mode control signal to the optical transmission block 121 of the optical transceiver 120. In this case, for the burst mode control signal, enable time and disable time may be determined based on upstream data transmission permission time allocated from an OLT connected to the ONU 100.

The optical transmission block 121 may transmit an upstream optical signal to the OLT through a light source of the light source block 122 using the burst mode control signal and the MAC electrical signal received from the MAC 110. More specifically, the optical transmission block 121 may be implemented as an electronic chip including a clock and data recovery circuit, a modulation voltage output circuit, and the like, to convert the MAC electrical signal received from the MAC 110 into the optical signal.

The light source block 122 may be implemented as a DFB-laser diode (LD), and a DFB-LD capable of direct modulation may be mainly used. However, the type of the light source is not limited thereto, and various types of light sources may be used.

The light receiving block 123 may continuously receive a downstream optical signal from the OLT, and the optical reception block 124 may recover clock and data of the downstream optical signal received through the light receiving block 123 and transmit the signal to the MAC 110.

Finally, the control block 125 may control operations of the optical transmission block 121, the light source block 122, the light receiving block 123, and the optical reception block 124 included in the optical transceiver 120.

Figure 2:
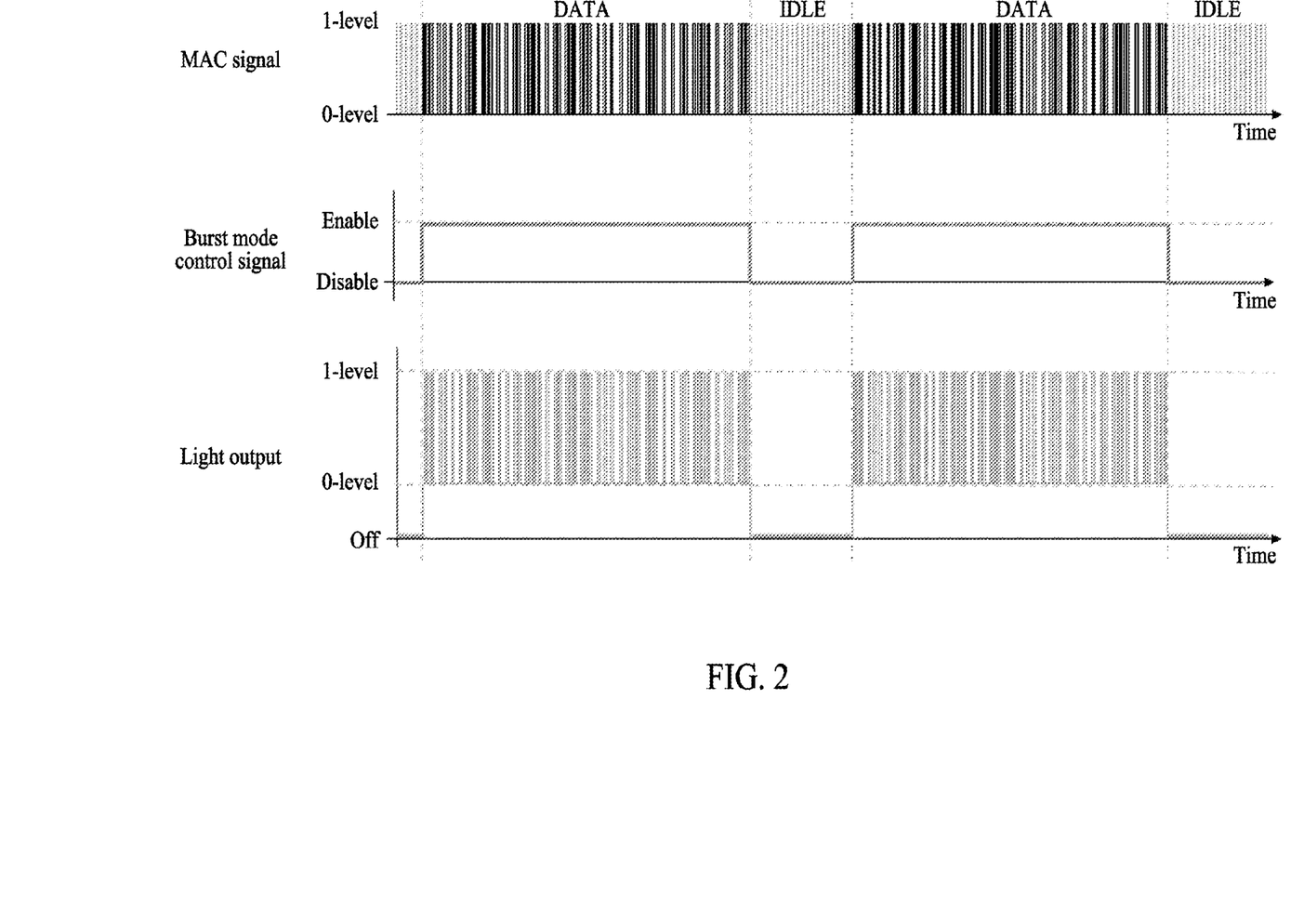
FIG. 2 is a diagram illustrating an upstream electrical/optical signal and a burst mode control signal according to an example embodiment.

FIG. 2 is a diagram illustrating an upstream electric/optical signal and a burst mode control signal according to an example embodiment.

FIG. 2 illustrates the MAC electrical signal and the burst mode control signal output from the MAC 110, and output of the light source. In this case, the MAC electrical signal may include a DATA signal area including a valid data signal and an IDLE signal area including an invalid signal.

First, since the MAC 110 outputs a DATA signal during the time when the burst mode control signal is enabled, and outputs an IDLE signal during the time when the burst mode control signal is disabled, the MAC electrical signal may be output as a continuous signal.

The optical transceiver 120 may control a driving voltage of the light source according to the burst mode control signal transmitted from the MAC 110, and may output the MAC electrical signal as the optical signal when the burst mode control signal is enabled, and may not output the optical signal when the burst mode control signal is disabled, as shown in FIG. 2.

However, when power corresponding to 1-level of the IDLE signal is applied to the light source, since the operation control of the light source is not accurately controlled even in the case that the burst mode control signal is disabled, the optical signal may be output and be overlapped with an optical signal output from another ONU, thereby increasing a possibility of occurrence of an error.

In order to solve this issue, the ONU 100 according to example embodiments may provide a method of removing the idle signal included in the MAC electrical signal through the following method.

The idle signal included in the MAC electrical signal may be removed from the MAC and output, but in this case, the electrical signal input to the clock and data recovery circuit is input in the burst mode. Therefore, since the time required for clock and data recovery of each burst mode signal is 1 us or longer, the signal cannot be used because the time exceeds a time standard required by the TDM-PON (hundreds of ns).

Figure 3:
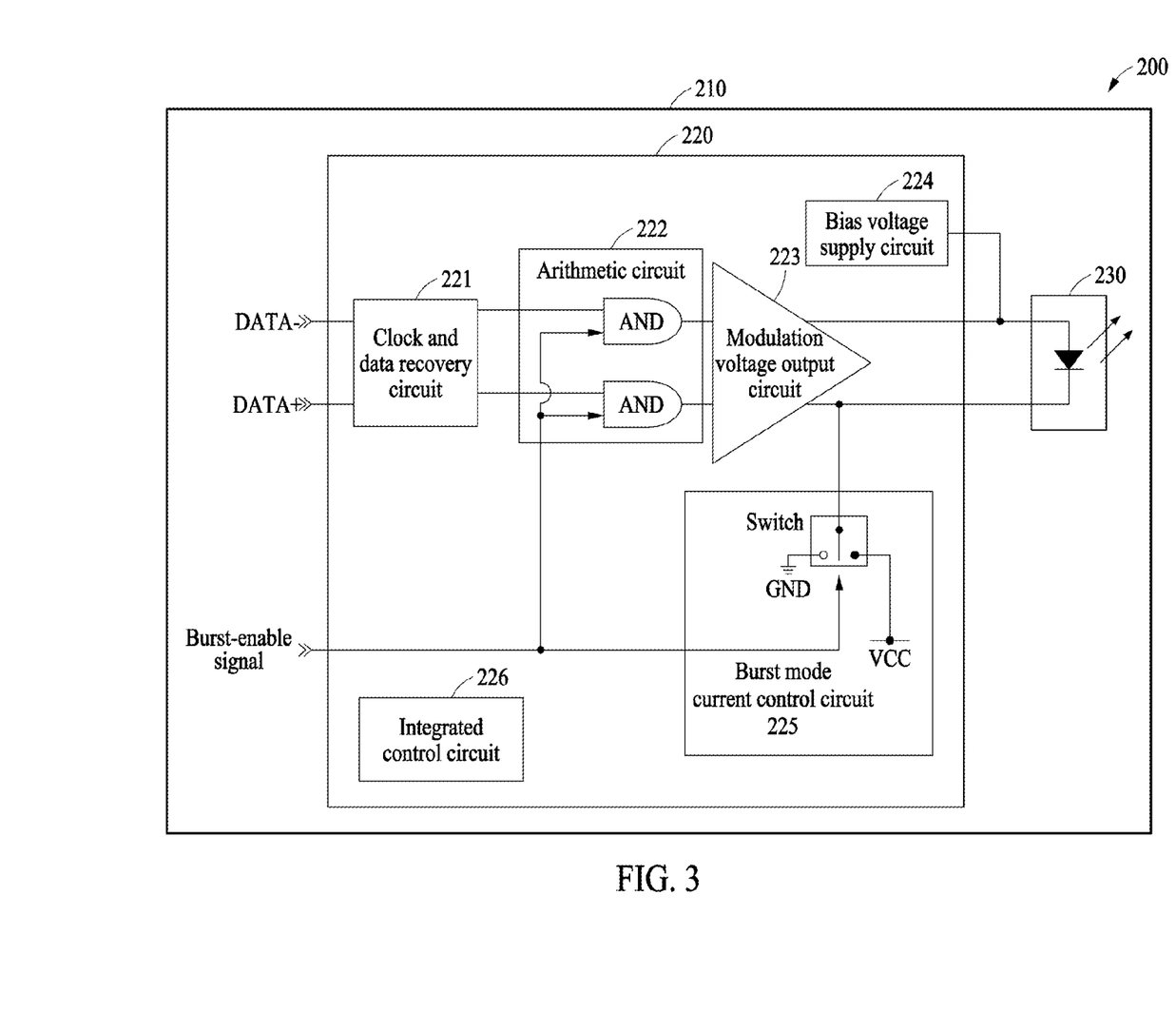
FIG. 3 is a diagram illustrating a structure of a burst mode optical transmitter according to a first example embodiment.

FIG. 3 is a diagram showing a structure of a burst mode optical transmitter according to a first example embodiment.

Referring to FIG. 3, an optical transceiver 210 of a burst mode optical transmitter 200 according to the first example embodiment may include an electronic circuit 220 and a light source 230. In this case, the electronic circuit 220 may include a clock and data recovery circuit 221, an arithmetic circuit 222, a modulation voltage output circuit 223, a bias voltage supply circuit 224, a burst mode current control circuit 225, and an integrated control circuit 226.

First, the clock and data recovery circuit 221 of the electronic circuit 220 may receive a burst mode control signal and a MAC electrical signal from MAC. In this case, the MAC electrical signal may include a valid data signal and an idle signal according to the burst mode control signal. In other words, the valid data signal may be included in the MAC electrical signal during the time when the burst mode control signal is enabled, and the idle signal may be included in the MAC electrical signal during the time when the burst mode control signal is disabled. Accordingly, the clock and data recovery circuit 221 may receive a continuous electrical signal from the MAC.

The arithmetic circuit 222 may receive the burst mode control signal and the MAC electrical signal in which clock and data are recovered through the clock and data recovery circuit 221, and may remove the idle signal included in the MAC electrical signal.

More specifically, the arithmetic circuit 222 may include an AND gate, and the electrical signal may be output as high only when the levels of the MAC electrical signal and the burst mode control signal are both high (corresponding to 1-level of the corresponding signals).

Table 1 below shows input and output levels of the arithmetic circuit 222 according to the burst mode control signal.

TABLE 1

| Type | Arithmetic circuit input level | Burst mode control signal level | Arithmetic circuit output level |
|---|---|---|---|
| DATA signal | High | High (Enable) | High |
| | Low | High (Enable) | Low |
| IDLE signal | High | Low (Disable) | Low |
| | Low | Low (Disable) | Low |

Figure 4:
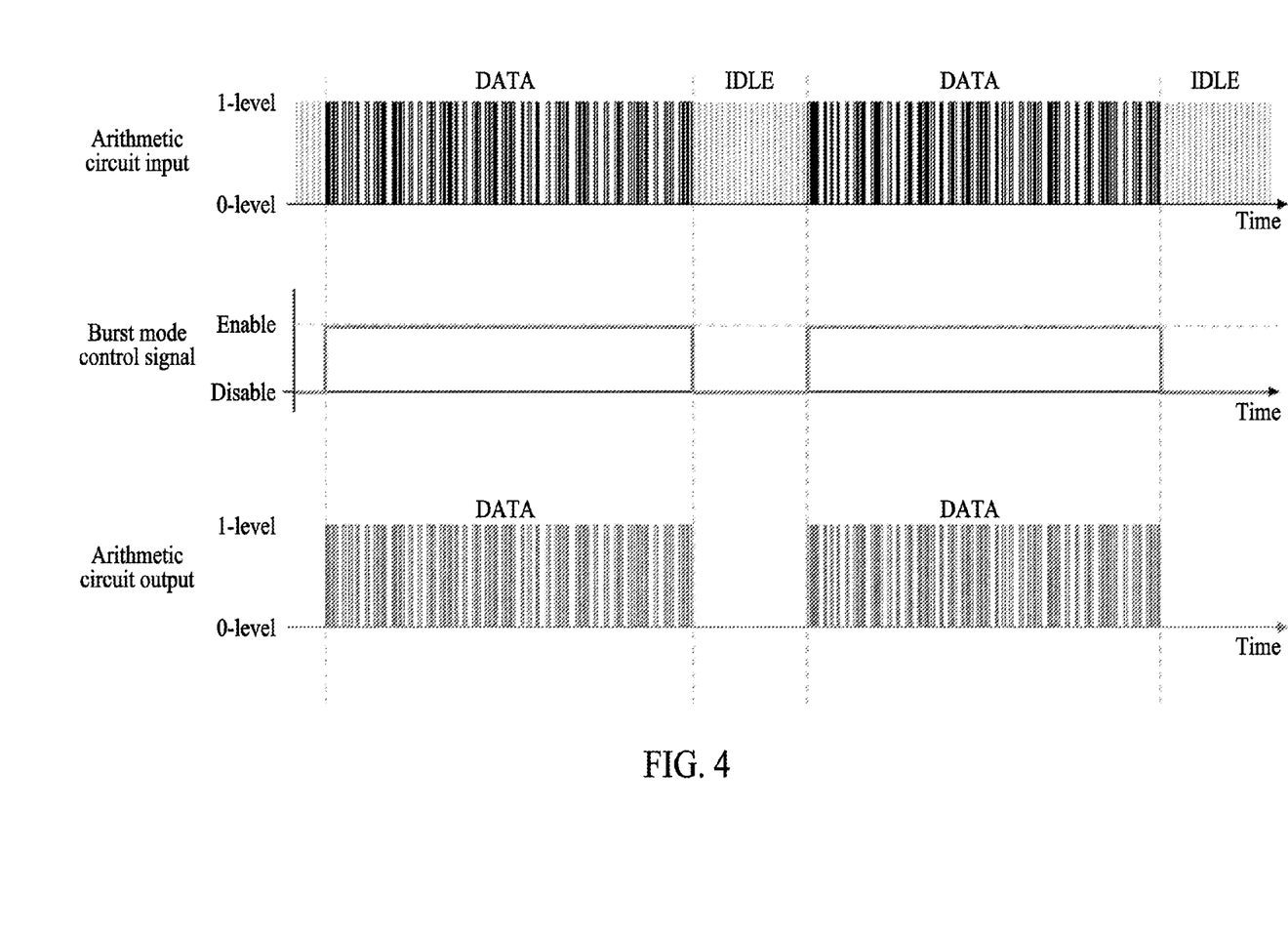
FIG. 4 is an input/output diagram of an arithmetic circuit according to the first example embodiment.

Referring to Table 1 above, when the burst mode control signal is enable (High), the output of the arithmetic circuit 222 may be the same as the input. In other words, during the time when the burst mode control signal is enabled, the input and output of the DATA signal may be the same with no change in 1-level and 0-level, as shown in FIG. 4. However, during the time when the burst mode control signal is disabled (Low), the output of the arithmetic circuit 222 may always be output as Low regardless of the input as shown in FIG. 4.

In other words, in the burst mode optical transmitter 200 according to example embodiments, even if a signal is continuously input to the arithmetic circuit 222, the IDLE signal may be output as 0-level during the time when the burst mode control signal is disabled, and a result value of the arithmetic circuit 222 may be transmitted to the modulation voltage output circuit 223.

The modulation voltage output circuit 223 may output an electrical signal required for modulation of the light source 230 using the result value of the arithmetic circuit 222. Here, since the IDLE signal is output as 0-level during the time when the burst mode control signal is disabled, even if operating power is supplied through the bias voltage supply circuit 224, a potential difference between both ends of the light source 230 may be adjusted and the result value of the arithmetic circuit 222 may be controlled so that light output becomes 0-level.

In the burst mode current control circuit 225, when the burst mode control signal is enabled, an electric switch may be connected to the ground, and accordingly, the potential difference between both ends of the light source 230 becomes higher than the driving voltage of the light source 230 and the optical signal may be output from the light source 230. Contrary to this, in the burst mode current control circuit 225, when the burst mode control signal is disabled, the electric switch may be connected to a collector voltage Vcc, and accordingly, the potential difference between both ends of the light source 230 becomes lower than the driving voltage of the light source 230 and no optical signal may be output from the light source 230.

More simply, when outputting the IDLE signal from the MAC, it may be programmed to always output as 0-level, but in this case, there may be an issue in clock data recovery.

According to the first example embodiment, the electronic circuit 220 may be implemented in the form of an electronic chip capable of driving the light source 230 and the light receiving block included in the optical transceiver 210 of the burst mode optical transmitter 200. Further, since the electronic circuit 220 needs to convert the burst mode control signal output from the MAC into a high-speed digital signal, an analog-to-digital converter may be further included in the configuration of the present disclosure.

The burst mode current control circuit 225 included in the burst mode optical transmitter 200 according to the first example embodiment may be implemented by being included in the electronic circuit 220, or may be separately externally implemented according to a way of implementing the electric switch.

Figure 5:
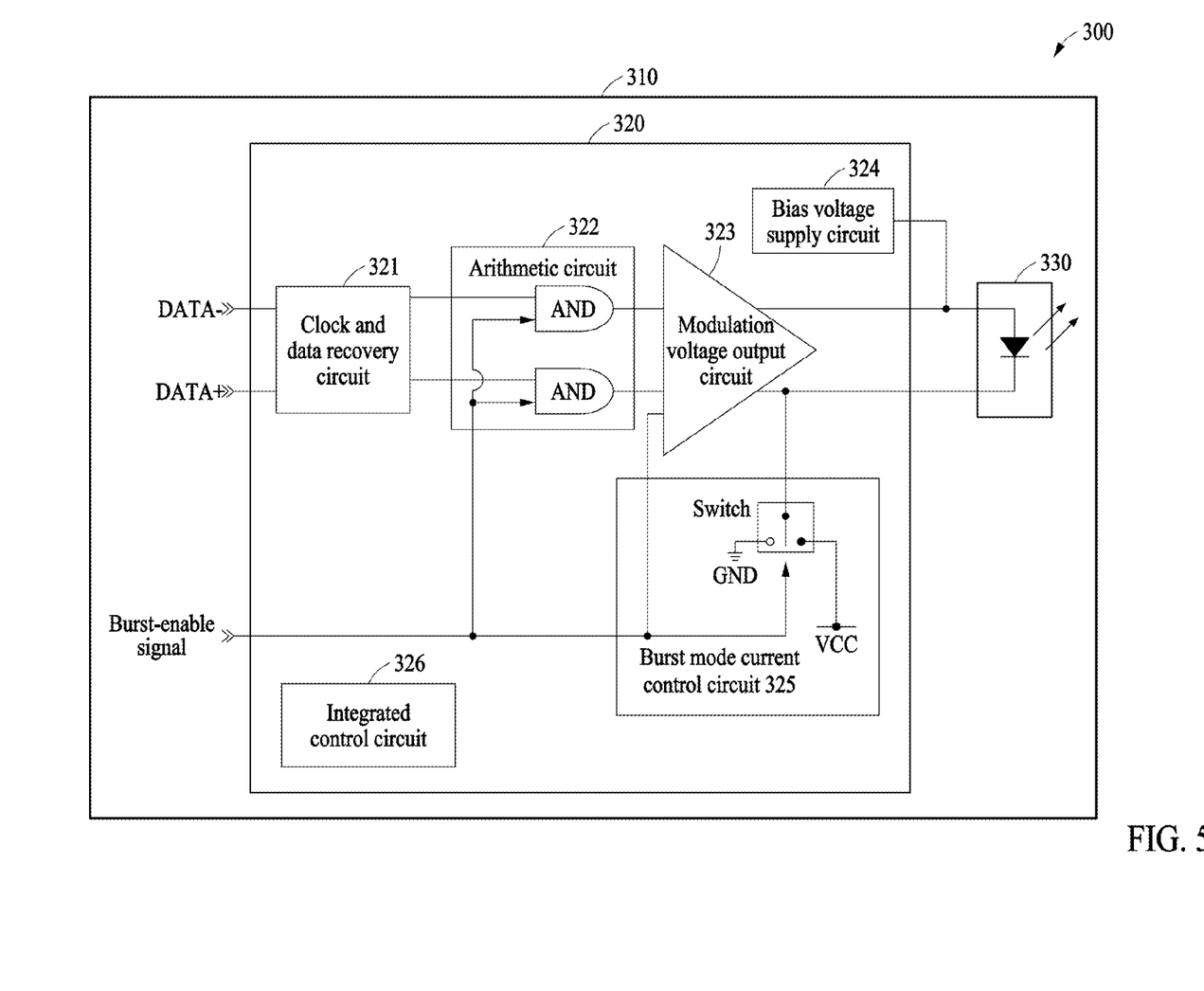
FIG. 5 is a diagram illustrating a structure of a burst mode optical transmitter according to a second example embodiment.

FIG. 5 is a diagram illustrating a structure of a burst mode optical transmitter according to a second example embodiment.

Referring to FIG. 5, according to the second example embodiment, an optical transceiver 310 of a burst mode optical transmitter 300 may include an electronic circuit 320 and a light source 330. In this case, the electronic circuit 320 may include a clock and data recovery circuit 321, an arithmetic circuit 322, a modulation voltage output circuit 323, a bias voltage supply circuit 324, a burst mode current control circuit 325, and an integrated control circuit 326.

In this case, each component included in the burst mode optical transmitter 300 may perform the same operation as each component included in the burst mode optical transmitter 200 shown in FIG. 3.

However, in the burst mode optical transmitter 300 according to the second example embodiment, the burst mode control signal may be applied to the modulation voltage output circuit 323. In this case, the modulation voltage output circuit 323 may operate normally when the burst mode control signal is enabled, and be powered off when the burst mode control signal is disabled. Here, the modulation voltage output circuit 323 may be configured as a voltage amplifier, and a method of cutting off power supplied to the voltage amplifier may be used.

In this way, the burst mode optical transmitter 300 may minimize or block the modulation voltage applied to the light source 330 when the burst mode control signal is disabled, thereby preventing the optical signal from being output from the light source 330.

Therefore, the burst mode optical transmitter 300 outputs the optical signal only when the burst mode control signal is enabled, thereby preventing optical overlap with an optical signal output from another ONU and reducing a possibility of an error of the upstream signal.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include all computer storage media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A burst mode optical transmitter comprising:
    a clock and data recovery circuit configured to receive a media access control (MAC) electrical signal including a valid data signal and an idle signal from MAC of an optical network unit (ONU) according to a burst mode control signal;
    an arithmetic circuit configured to remove the idle signal included in the MAC electrical signal by using the burst mode control signal and the MAC electrical signal in which clock and data are recovered through the clock and data recovery circuit;
    a modulation voltage output circuit configured to output an electrical signal including a modulation voltage and a bias voltage required for modulation of a light source including a laser diode by using the MAC electrical signal from which the idle signal is removed; and
    a bias voltage supply circuit configured to provide operating power for the light source to output an optical signal based on the electrical signal output through the modulation voltage output circuit.

2. The burst mode optical transmitter of claim 1, wherein the arithmetic circuit comprises a logic gate configured to provide High output only when levels of the MAC electrical signal and the burst mode control signal are both high.

3. The burst mode optical transmitter of claim 2, wherein the logic gate is an AND gate.

4. The burst mode optical transmitter of claim 1, further comprising:
    a burst mode current control circuit configured to control output of the light source by adjusting a voltage across both ends of the light source including the laser diode based on the burst mode control signal.

5. The burst mode optical transmitter of claim 4, wherein the burst mode current control circuit comprises an electric switch configured to be connected to ground when the burst mode control signal is enabled and be connected to a collector voltage (Vcc) when the burst mode control signal is disabled.

6. A burst mode optical transmitter comprising:
    a clock and data recovery circuit configured to receive a media access control (MAC) electrical signal including a valid data signal and an idle signal from MAC of an optical network unit (ONU) according to a burst model control signal;
    an arithmetic circuit configured to remove the idle signal included in the MAC electrical signal by using the burst mode control signal and the MAC electrical signal in which the clock and data are recovered through the clock and data recovery circuit;
    a modulation voltage output circuit configured to output an electrical signal required for modulation of a light source by using the MAC electrical signal from which the idle signal is removed; and
    a burst mode current control circuit configured to control output of the light source by adjusting a voltage across both ends of the light source based on the burst mode control signal,
    wherein it is determined whether or not the modulation voltage output circuit operates according to the burst mode control signal.

7. The burst mode optical transmitter of claim 6, wherein the modulation voltage output circuit is configured to operate normally when the burst mode control signal is enabled, and be powered off when the burst mode control signal is disabled.

8. The burst mode optical transmitter of claim 6, wherein the arithmetic circuit comprises a logic gate configured to provide High output only when levels of the MAC electrical signal and the burst mode control signal are both High.

9. The burst mode optical transmitter of claim 8, wherein the logic gate is an AND gate.

10. The burst mode optical transmitter of claim 6, wherein the burst mode current control circuit comprises an electric switch configured to be connected to ground when the burst mode control signal is enabled and be connected to a collector voltage (Vcc) when the burst mode control signal is disabled.

11. A burst mode optical transmitter comprising:
    a clock and data recovery circuit configured to receive a media access control (MAC) electrical signal including a valid data signal and an idle signal from MAC of an optical network unit (ONU) according to a burst mode control signal;
    an arithmetic circuit configured to remove the idle signal included in the MAC electrical signal by using the burst mode control signal and the MAC electrical signal in which clock and data are recovered through the clock and data recovery circuit;
    a modulation voltage output circuit configured to output an electrical signal required for modulation of a light source by using the MAC electrical signal from which the idle signal is removed;
    a bias voltage supply circuit configured to provide operating power for the light source to output an optical signal based on the electrical signal output through the modulation voltage output circuit; and
    a burst mode current control circuit configured to control output of the light source by adjusting a voltage across both ends of the light source based on the burst mode control signal,
    wherein the arithmetic circuit comprises an AND gate configured to provide High output only when the input of the MAC electrical signal and the burst mode control signal are both High, and
    it is determined whether or not the modulation voltage output circuit operates according to the burst mode control signal.

12. The burst mode optical transmitter of claim 11, wherein the modulation voltage output circuit is configured to operate normally when the burst mode control signal is enabled, and be powered off when the burst mode control signal is disabled.

13. The burst mode optical transmitter of claim 11, wherein the burst mode current control circuit comprises an electric switch configured to be connected to ground when the burst mode control signal is enabled and be connected to a collector voltage (Vcc) when the burst mode control signal is disabled.

* * * * *